United States Patent [19]
Pedrini

[11] Patent Number: 5,226,570
[45] Date of Patent: Jul. 13, 1993

[54] SELF-CENTERING ROOF RACK

[76] Inventor: Fabio Pedrini, Via Zamboni 1 Scala a Piano 1 Int. 3, CAP 40125, Bologna, Italy

[21] Appl. No.: 912,808

[22] Filed: Jul. 13, 1992

[30] Foreign Application Priority Data

Jul. 16, 1991 [IT] Italy .................. BO91A000256
Jun. 29, 1992 [IT] Italy .................. BO92U000142

[51] Int. Cl.⁵ .................. B60R 9/00; B60R 9/058
[52] U.S. Cl. .................. 224/329; 224/315; 224/322; 224/321; 224/324
[58] Field of Search ........ 224/42.01, 42.03 R:42.03 B, 224/279, 309, 310, 314–316, 321–325, 329–331, 917

[56] References Cited

U.S. PATENT DOCUMENTS

| | | | |
|---|---|---|---|
| 2,222,636 | 11/1940 | Strauss | 135/88 |
| 2,480,353 | 8/1949 | Bjork | 224/315 |
| 2,720,350 | 10/1955 | Felton | 224/323 |
| 2,788,929 | 4/1957 | Gallagher | 224/323 |
| 2,833,453 | 5/1958 | Barreca | 224/315 |
| 2,888,178 | 5/1959 | Olson | 224/328 |
| 3,877,624 | 4/1975 | Carson | 224/323 |
| 3,897,895 | 8/1975 | Read | 224/323 |
| 3,931,919 | 1/1976 | Gerber et al. | 224/324 |
| 4,101,061 | 7/1978 | Sage et al. | 224/322 |
| 4,264,025 | 4/1981 | Ferguson et al. | 224/321 |
| 4,449,656 | 5/1984 | Wouden | 224/320 |
| 4,461,414 | 7/1984 | Gieber | 224/315 |
| 4,688,706 | 8/1987 | Thulin | 224/329 |
| 4,757,929 | 7/1988 | Nelson | 224/309 |
| 4,877,169 | 10/1989 | Grim | 224/331 |

FOREIGN PATENT DOCUMENTS

220510  2/1959  Australia ............ 224/329

Primary Examiner—Henry J. Recla
Assistant Examiner—Robert A. Goldman
Attorney, Agent, or Firm—Ryan, Kees & Hohenfeldt

[57] ABSTRACT

A self-centering roof rack system for transporting bicycles and other sporting goods on a motor vehicle. The rack includes a transverse bar mounted on the roof and supported by upright members at each end. The upright members are simultaneously moveable by rotation of a knob at one end of the rack by means of rotation of a threaded shaft which has right hand threads on one end and left hand threads on the other. The upright members are provided with either a pivoting or sliding mechanism that causes a floating hook adapted to grip a motor vehicle root edge, the hook being caused to move upwardly and outwardly to firmly engage the roof as the uprights are moved toward each other.

6 Claims, 8 Drawing Sheets

SELF-CENTERING ROOF RACK

FIELD OF THE INVENTION

The invention relates to self-centering roof rack systems for motor vehicles. More particularly, the invention relates to such systems that can be attached to or removed from the vehicle by a single handle mechanism. The handle operates on a threaded shaft, one half of the shaft with right screw thread, the other half with left screw thread, and works simultaneously upon two nuts, each connected to one of the roof rack uprights: each of the above-mentioned uprights ending with a floating hook which grips the motor vehicle roof edge. The double screw allows the fitting and fastening of the roof rack on the vehicle's roof symmetrically by turning a handle placed on one side of the system.

SUMMARY OF THE INVENTION

This invention relates to a roof rack system provided with self-centering means adapted to fit the roof of a motor vehicle. The system includes an alignment and rapid locking device operable by means of a mechanism operated by a single handle or knob. Commonly available roof racks consist of a transverse bar supported by two lateral uprights one on each side onto which the bar is connected with, the uprights being adjustable on the bar. These uprights are fastened to the roof of the vehicle by means of bolted brackets which are attached to the edge of the roof. It is evident that the initial setting of the system requires skill from the user because the bar must be centered to the uprights and this may require several attempts.

Other systems consist of eccentric leverages, placed in relation to the lateral uprights in order to lock contemporaneously the upright to the roof and the transverse bar to the upright. This solution also implies several attempts in order to achieve a good centering of the transverse bar.

It is an object of the invention to solve the foregoing inconveniences and shortcomings because it allows, with only one easy and rapid operation, the setting and attachment to a motor vehicle roof rack without any previous adjustment.

In accordance with the invention the transverse bar and the two upright holders are connected so that they form a single body. By means of mechanical devices the locking force is transmitted to fasten the roof rack system to the vehicle. By turning a knob located at one end of the transverse bar, a horizontal translation force is applied on the uprights. Then a vertical fastening force is produced by movement on the uprights of clips engaging the vehicle roof gutters thereby fitting the uprights to the roof of the vehicle and locking the transverse bar in a stable position.

The mechanism is conceived so that the horizontal centering force is greater than the vertical force and thereby contributes to the fastening of the rack without damaging or deforming the roof of the vehicle. An important aspect of the invention is to provide a construction in which the action required for securing the bracket to the roof is combined with movement of the support toward the center of the roof using a simple and reliable mechanism.

The balance of the forces operating on the movable parts, under the action of the handle, allows secure fastening of the system long before any damage or deformation of the car could occur because the fastening force commences early thereby alerting the operator to the fact that the attachment has been completed. The transverse bar can be manufactured by extrusion of metal of adequate cross-section. Various bicycle supporting parts of the system are individually removably and slidably attached to the rack.

DRAWINGS

In the following description and accompanying drawings other purposes and advantages will become apparent as well as an exemplary embodiment of the invention.

DETAILED DESCRIPTION

Figure 4:
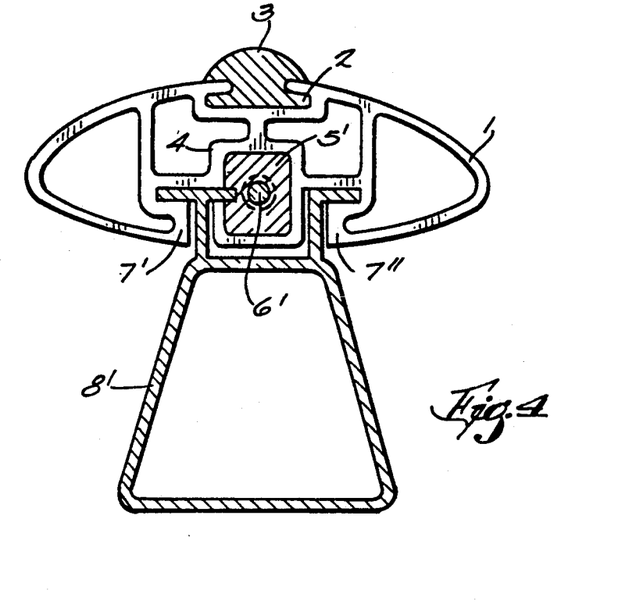
FIG. 4 illustrates a transverse section of the same bar showing the connection with one of the lateral uprights.

The roof rack system consists essentially of a transverse bar 1 manufactured by extrusion in which its elliptical cross-section contributes both to the stiffness and streamlined configuration of the structure (FIG. 4). Internal ribs provide strength and rigidity to bar 1. The section of the bar provides three main features: a top groove 2 adapted to receive accessory mounts 3; a central opening 4 fitted to receive nuts 5 operated by a threaded shaft 6; and a double lower slot 7', 7" on which the uprights 8', 8" connected to the nuts 5', 5".

The shaft 6 has threads on each end 6', 6", respectively, with right and left threads. The threads work on respective nuts 5', 5". The uprights 8' and 8" are provided with seats that receive the above-mentioned nuts.

Rotation of the shaft causes the uprights to move toward or away from each other depending on the direction of rotation.

Each one of the uprights 8', 8" is provided with four pins 10', 11', 12', 13' on which the lever of a parallelogram constituted by the arms 14', 15', 16' and upright 8' itself are articulated. The same description applies to the identical upright 8" with pins 10", 11", 12", 13" and arms 14", 15", 16". Pin 12" is also articulated to hook 17' which can be inserted into the space between the door 18' and the roof 19 of the vehicle.

The outline of the hooks 17', 17" allows the attachment to a number of vehicle types with similar outline of the doors and roof. In order to fit the roof rack to a large number of models of contemporaneous product, it is necessary to provide a certain number of similar yet non-identical hooks, all of them however utilizing the same system of fastening.

Figure 3:
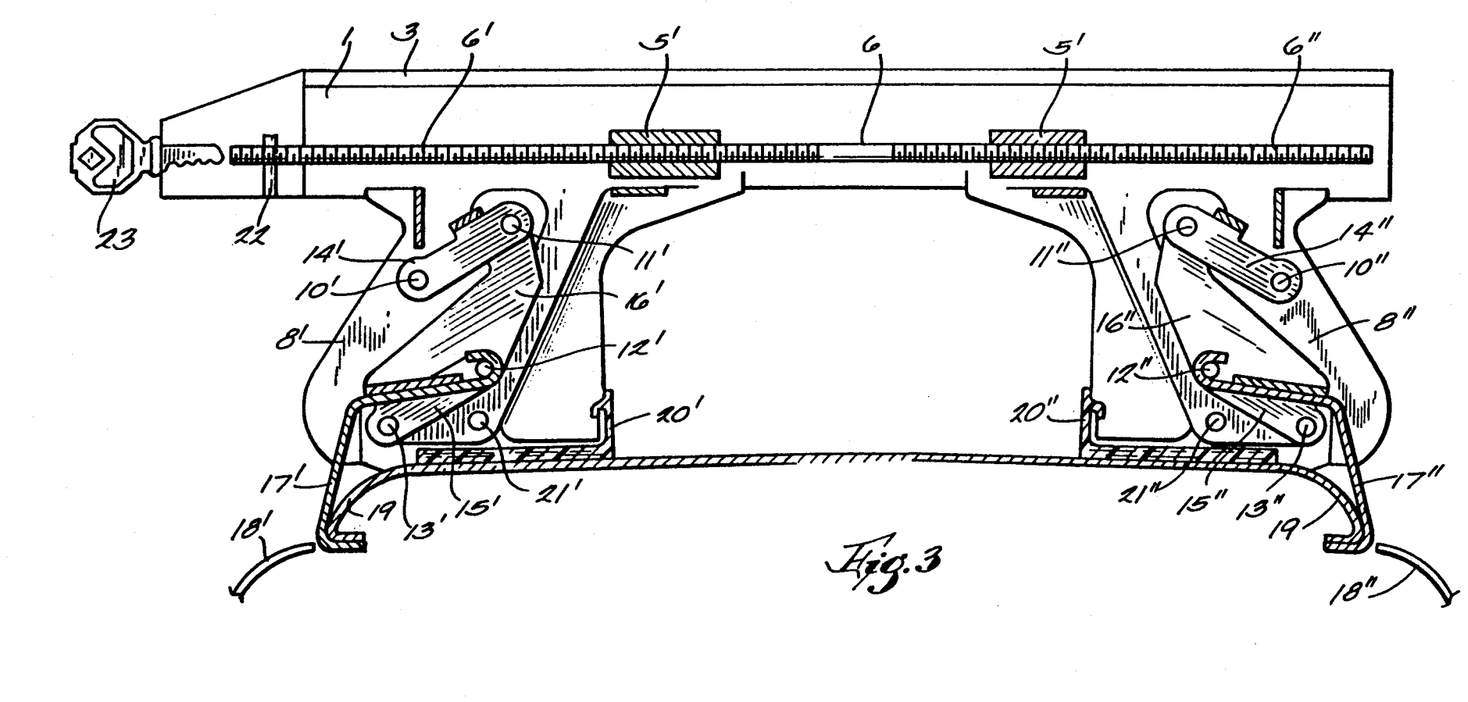
FIG. 3 illustrates a longitudinal section of the transverse bar showing inside and outside details.

Also, the uprights 8', 8" are provided with cover moldings 20', 20" with the pins 21', 21", manufactured from soft material in order not to damage the paint of the roof 19. The handle 9 is attached to the shaft 6 with a pin 22 (FIG. 3) and is shaped with an elliptical asymmetric profile towards the main axis.

Figure 5:
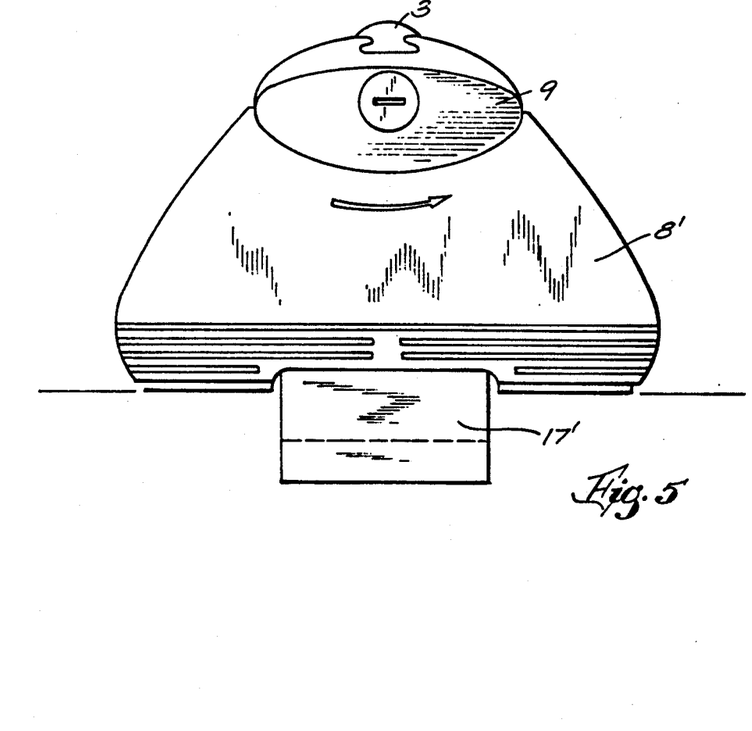
FIGS. 5 and 6 are end views showing the manually rotatable end cap in the unlocked and locked positions, respectively.
Figure 6:
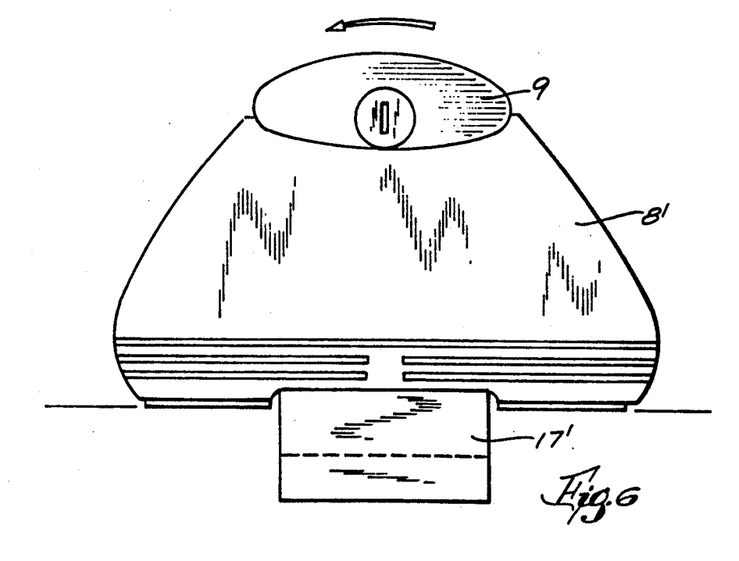

This shape allows the uncovering with a 180° rotation of the end of upper accessory channel 3 (FIG. 5) and the insertion therein or removal of accessories 3. The groove is again closed by a further 180° rotation around the asymmetric rotation center constituted by the shaft 6.

Following this procedure the handle allows contemporaneously two functions, that is to say the rotation on the screw in order to fasten the roof rack to the car and the locking function to lock the accessories to the bar. Use of a lock plug with its key avoids unauthorized people from operating the handle 9. Use and fitting of the rack on the vehicle's roof is summarized by the following steps.

Figure 1:
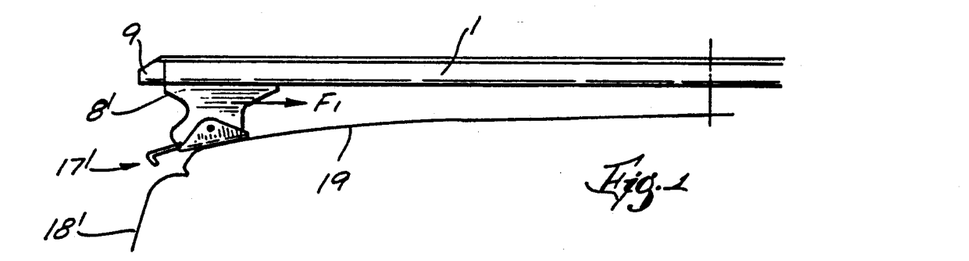
FIG. 1 depicts a lateral view of the roof rack simply resting on the roof of the vehicle.
Figure 2:
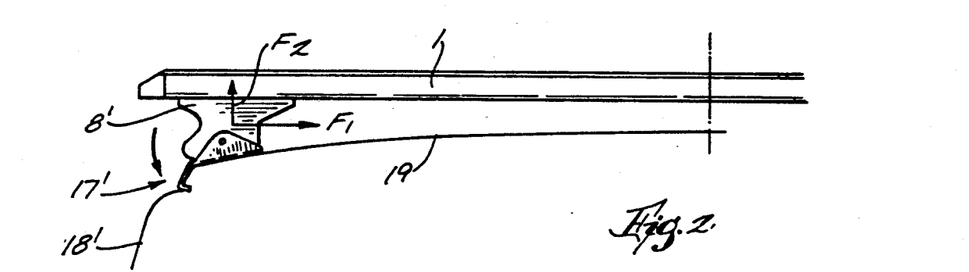
FIG. 2 illustrates the same roof rack fastened to the roof.

The user, by turning handle 9, (FIG. 1) first spreads the uprights 8', 8" to their maximum spacing then with inverse rotation of handle 9 causes the simultaneous and symmetric movement toward each other of the uprights 8', 8" until the hooks 17', 17" do engage the slots between the door 18', 18" and the roof 19. As the hooks 17', 17" engage the slots, the horizontal force F1 caused by the threaded shaft 6, tilts the floating quadrilaterals connecting the hooks 17', 17" to the uprights 8', 8" causing the start of a second force F2 which is vertical and weaker than F1 thereby locking the transverse bar 1. In this manner the roof rack is assembled and fastened, centered exactly with the single operation of the handle 9.

Figure 7:
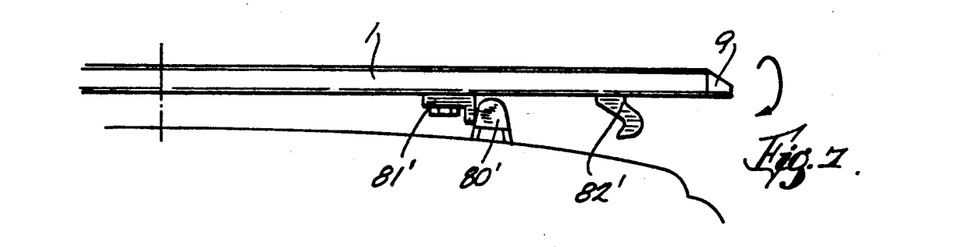
FIGS. 7 and 8 are side views depicting the installation of the rack on pre-fixed roof supports.
Figure 8:
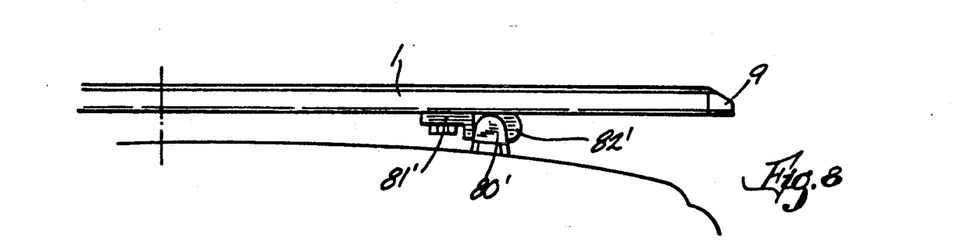
Figure 9:
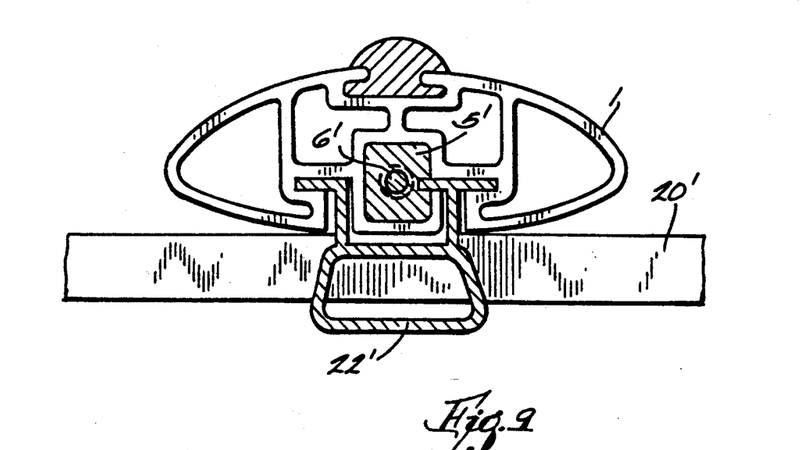
FIG. 9 is a cross-sectional view of the transverse bar showing the connecting system of the movable bracket with the adjustment nut.

A variant of the above system is represented by the assembling of the rack on vehicles having fixed guides pre-assembled on the roof. In this case (FIG. 7) the transverse bar 1 is not provided with uprights which are not then needed but rather is connected directly on the fixed guides 80'. The centering of the transverse bar 1 and the locking on the fixed guides 80' is allowed by two fixed brackets 81', bolted to the transverse bar 1 in a symmetric position and at a distance equal to the inner distance between the above-mentioned guides 80' and two movable hooks 82' connected to nut 5', 5" and using the previously described channel system.

By turning the handle 9 (FIG. 7) the hooks 82' approach each other symmetrically until they engage the fixed brackets 80' thus locking the transverse bar 1.

Figures 10, 11, 14, 15:
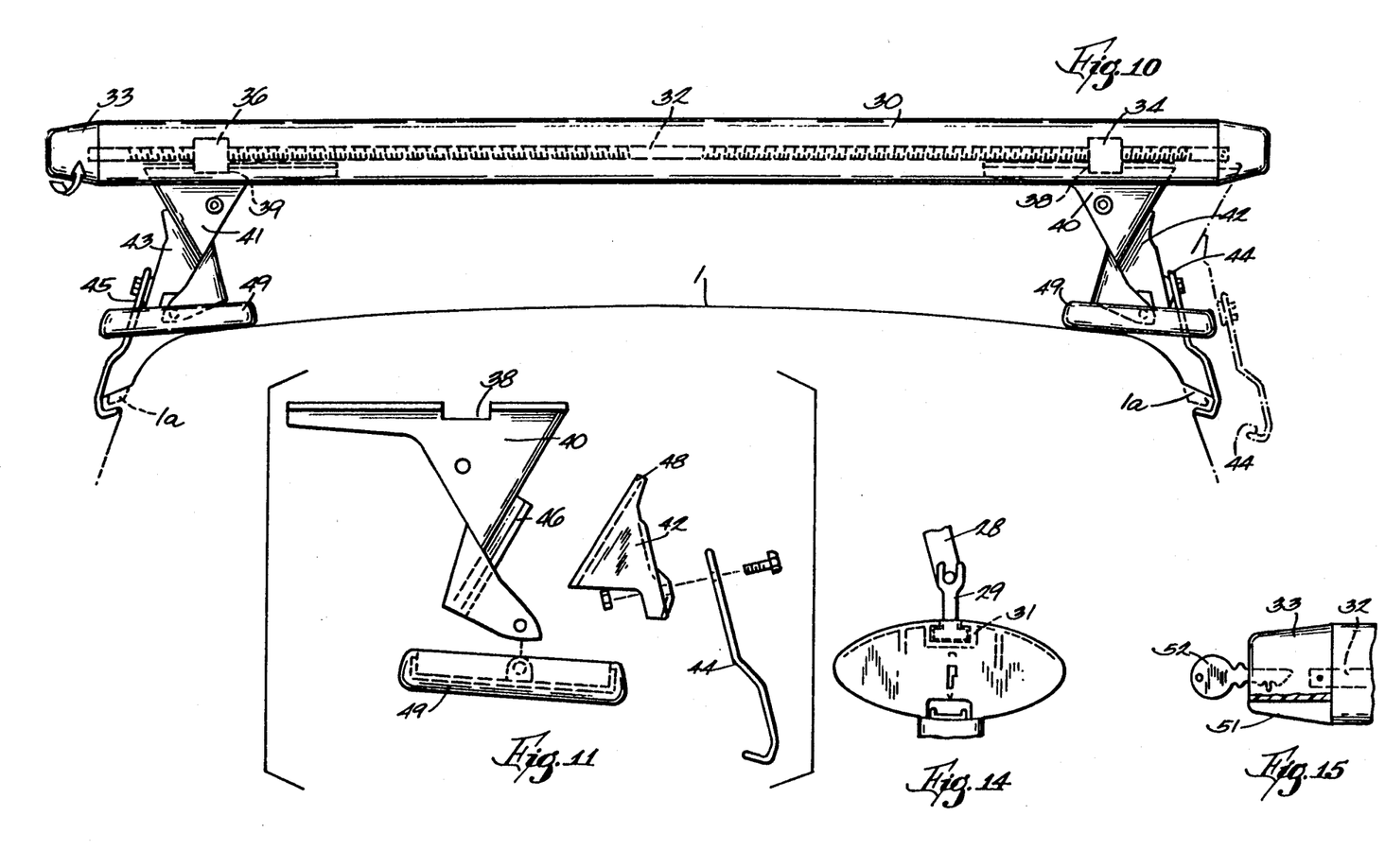
FIG. 10 is a rear view of a roof top rack in accordance with another embodiment of the invention with parts shown by phantom lines.
FIG. 11 is a broken apart rear view showing the end support components with a rack of this invention.
FIG. 14 is an end view of the transverse bar of the rack of this invention with internal parts shown by phantom lines.
FIG. 15 is a fragmentary end view showing the rotating knob of a rack of this invention.
Figure 12:
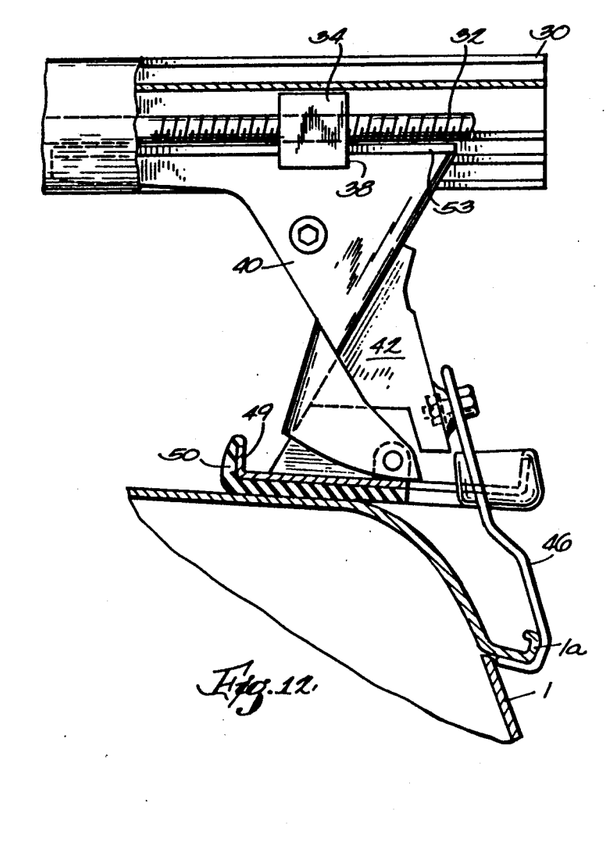
FIG. 12 is a rear view with parts broken away in section showing the end support components engaged on a vehicle roof.

A further embodiment of the invention is shown in FIGS. 10-15. In this embodiment an elliptically cross-sectioned transverse bar 30 is provided with an upwardly facing opening 31. Opening 31 as seen in FIG. 14 is adapted to receive hardware components 29 for receiving therein sporting goods 28 or other items to be transported. These components include various clamps, bolts and other attachment devices as are already known in the art.

Threaded rod 32 is provided with left hand threads on one end and right hand threads on the opposite ends so that nuts 34 and 36 threaded thereon will move in opposite directions as knob 33 affixed to the end of threaded rod 32 is rotated. Nuts 34 and 36 are fitted into notches 38 and 39 of triangularly-shaped end supports 40 and 41, respectively. Support bodies 42 and 43 are slidably attached to the upwardly and outwardly inclined surfaces of end supports 40 and 41, respectively. Support bodies 42 and 43 carry, angularly adjustably, hook members 44 and 45, respectively. Hooks 44 and 45 are adapted to engage roof gutters 1A in order to clamp the support in place on vehicle roof 1.

Figure 13:
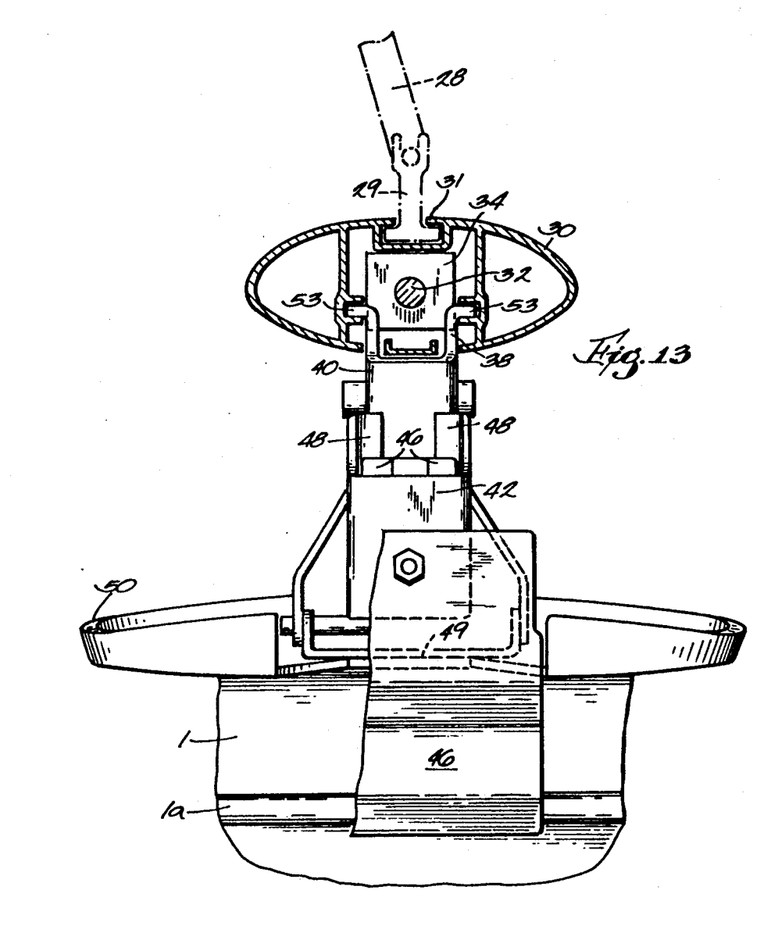
FIG. 13 is a side view with parts in section of the rack shown in FIG. 12.
Figure 16:
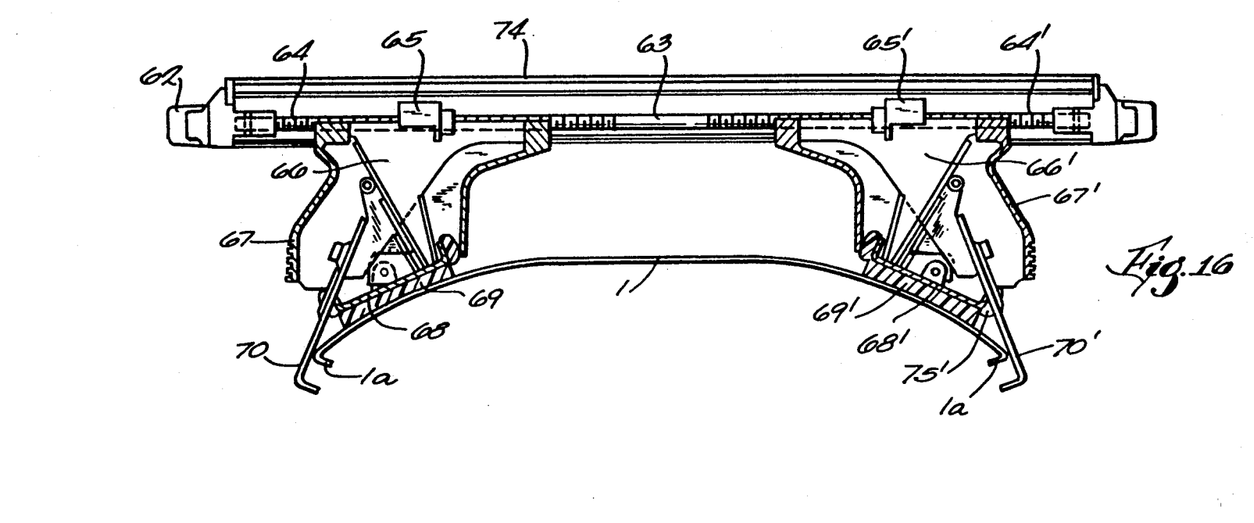
FIG. 16 is a rear view of a modified embodiment of the invention with parts in cross-section.
Figure 17:
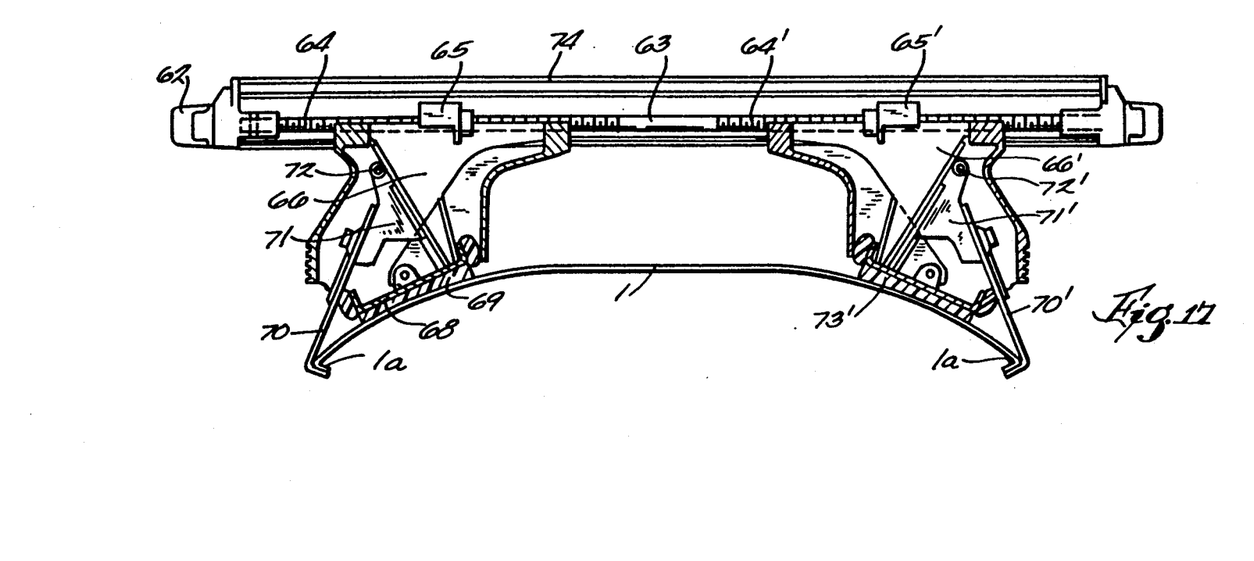
FIG. 17 is a rear view of the rack shown in FIG. 16 engaged on the roof of a vehicle.
Figure 18:
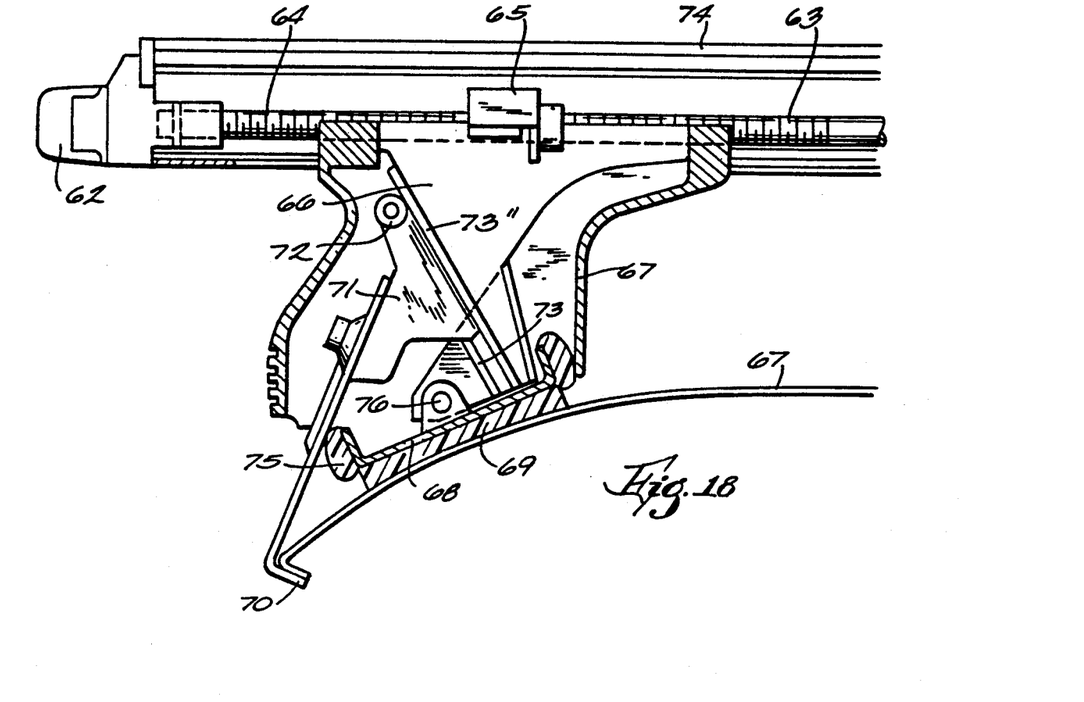
FIG. 18 is an enlarged fragmentary view of the rack shown in FIG. 17.
Figure 19:
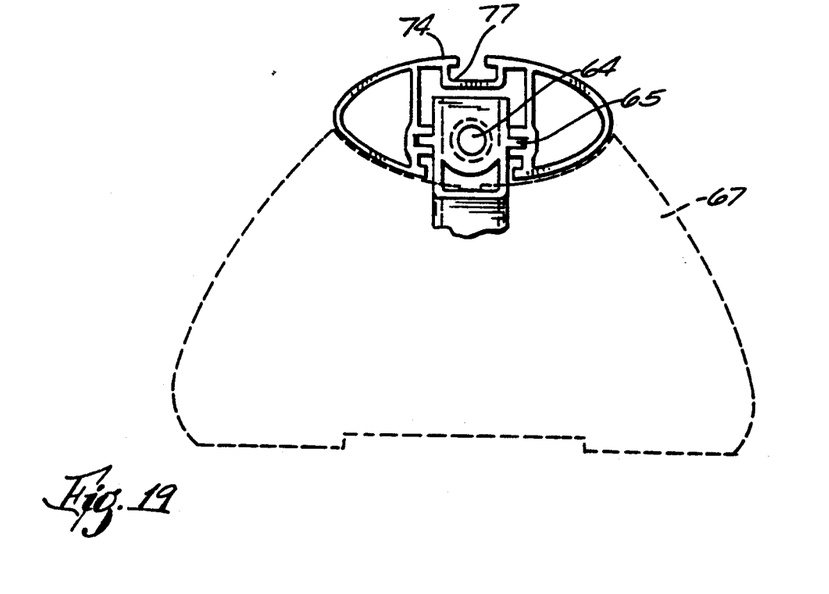
FIG. 19 is an end view of the rack of FIG. 18 with internal parts broken away and shown by dotted lines.

As best seen in FIGS. 11 and 13, support members 40 are provided with flanges 46. Support bodies 42 and 43 are similarly provided with inwardly extending flanges 48. As seen in FIG. 13, inner fitting flanges provide a track upon which member 42 slidably engages member 40. Components 41 and 43 are provided with a similar track arrangement. Support legs 49 are pivotally attached to the bottom of end supports 40 and 41 so that the rack can be placed on vehicle roofs of various configurations. Foot members 49 are preferably provided with a cushioning rubber layer 50 so as to avoid marring of the surface of vehicle roof 1. It will be noted that when nuts 34 and 36 are moved toward each other starting, for example, from the position shown by phantom lines in FIG. 10, that after hooks 44 and 45 engage opposite gutters 1A and nuts 34 and 36 continue to move toward the center of the vehicle, that members 42 and 43 will be forced to move upwardly and outwardly by sliding up the inclined surfaces of supports 40 and 41. This will cause the hooks 44 and 45 to engage the gutters with a generally upward motion causing the ends of the hooks to engage gutters 1A firmly. This motion causes the rack to be better attached to the vehicle than if the tops of the hooks were to pivot toward the center of the vehicle.

An alternate form of locking knob mechanism 33 is seen in FIGS. 10 and 15. In this modification the bottom 51 of knob 33 can be provided with a notch or channel so that when the bottom 51 is rotated to the top position the end of channel 31 will be exposed to allow insertion or removal of supporting members 29. When the knob 33 is once again rotated so that notch 51 faces downwardly, the knob can be locked by means of key 52 thereby locking the ends of channels 31 in the closed position and preventing removal therefrom of the sporting goods support 29. Note in FIGS. 12 and 13 that nut 34 is slidable in a channel formed by the underside of channel 31 and internal rib components of transverse bar 30. Note that outwardly extending flanges on the top of members 40 and 41 also provide means for slidably supporting the members relative to transverse bar 30 within channels formed in the internal ribbing.

FIGS. 16-19 show a further modification of the embodiment of FIGS. 10-15. Turning the knob 62 causes the central rod 63, which has an opposite thread at its ends 64, 64' to rotate. The bodies of the supports 66, 66' bear the nuts 65, 65' in a notch. The rotation of the knob 62 of the rod 63 therefore causes the supports 66, 66' to move towards each other with a self-centering action. The said supports consist of a series of parts enclosed in a casing 67, 67' made from thermoplastic or similar material which acts as a protective cover. The bottom of the plate 68, 68', rocking on its own pin 76 in relation to the support, rests on the roof 1 of the vehicle. Appropriate plastic bearings 69, 69' and 75, 75' allow a flexible support on the roof as well as sliding on it for the self-centering action, the casing 67, 67' providing a dust seal. As the knob 62 is turned by the user, the supports 66, 66' with the nut screws 65, 65' approach the center of the roof rack and the hooks 70, 70' lift up and hook onto the edge of the body. The supports' horizontal movement towards the center corresponds to the mechanical movement of the hook system and the upward traction in the supports themselves. The hooks 70, 70' are fixed to the molded and shaped bodies 71, 71' which carry a prismatic guide system 73, 73' and a roller 72, 72'.

The assembly allows the bodies 71, 71' to slide with the brackets in relation to the central body 66, 66'. The approximately 30° angle of the prismatic guides of the supports 71, 71' determines both dynamic action and the movement of the hooks 70, 70' which lift up and generate traction force on the hook as the support moves towards the center.

The roller 72 that follows the movement of the body 71 and the bracket 70 is in its lowered position when the hook is free and in its raised position when the hook 70 is tensioned with the roof rack fitted and fixed to the vehicle.

The detail in FIG. 4 offers a sectional view of the elliptical shape of the cross-member 74 with the upper channel 77 for fitting the accessories. The structure is ribbed to ensure maximum strength and rigidity. Located in a channel in the outer section of one end is the nut screw 65 or 65' which, operated by the threaded part 64 or 64' of the central rod, which is in turn operated by the knob 62, causes the whole support to move towards the center of the roof 1.

The invention herein depicted and illustrated by the foregoing example may be varied without departing from the spirit of the invention.

What is claimed is:

1. A luggage carrier for the roof of a motor vehicle comprising a substantially hollow elongated cross bar having top and bottom surfaces and opposite sides;

a support leg adjacent each end of the cross bar positioned in and movable linearly along a track formed in the bottom surface of said cross bar;

a threaded rod having two oppositely wound threaded segments extending along the length of and positioned within said cross bar and rotatably mounted therein;

an end member integrally attached to an end of said threaded rod and being rotatable therewith;

said cross bar member having an elongated channel running along the entire length of the top surface and adapted to receive article constraining members therein;

said channel being closed at the end of said cross bar opposite said end member;

said end member and said end of said cross bar adjacent said end member having substantially adjacent parallel surfaces perpendicular to said threaded rod, said end member being provided with a portion that closes the adjacent end of said channel and another portion that opens the end of said channel by rotation of said end member;

said end member further being provided with a lock whereby the end member can be locked in a position to close the end of said channel;

said each threaded segment of said threaded rod being threaded onto a nut member which is secured to one of said support legs whereby rotation of said end member in one direction causes said support legs to move toward each other and rotation in the opposite direction causes said support legs to move apart from each other.

2. A carrier according to claim 1 wherein a fastening clip adapted to engage a surface of the motor vehicle is attached to each of said legs.

3. A carrier according to claim 2 wherein each of said clips is carried on its respective support leg by means that causes said clip to rise toward said cross bar when the legs are moved toward each other.

4. A carrier according to claim 3 wherein the means for causing said clips to rise comprises an arm to which said clip is attached and which is pivotally attached to its respective leg member to pivot upwardly when said legs are moved toward each other.

5. A carrier according to claim 4 wherein said clip members are attached to a slidable member slidably carried in an outwardly and upwardly inclined track integral with said leg member.

6. A carrier according to claim 1 wherein both the cross bar and said end member are of an elliptical shape and said end member is connected to said threaded rod at an off-center location whereby rotation of said end member permits opening and closing of the end of said channel as said end member is rotated.

* * * * *